(No Model.)
J. W. BROWN.
ROAD CART.
No. 405,826.  Patented June 25, 1889.
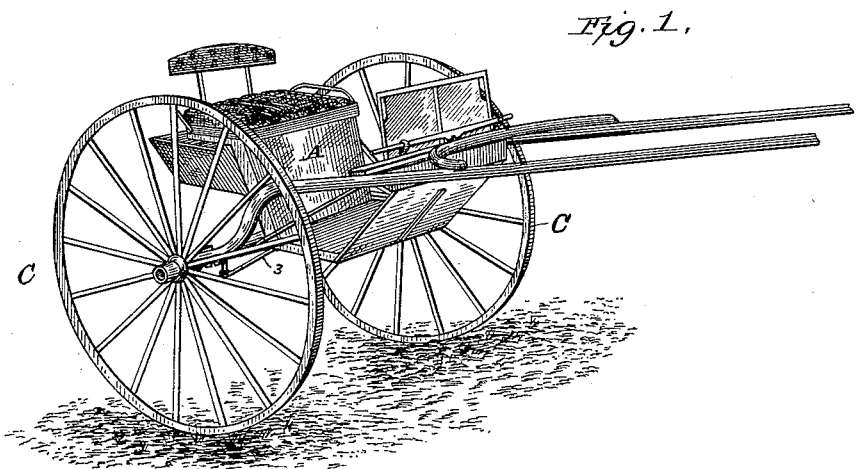
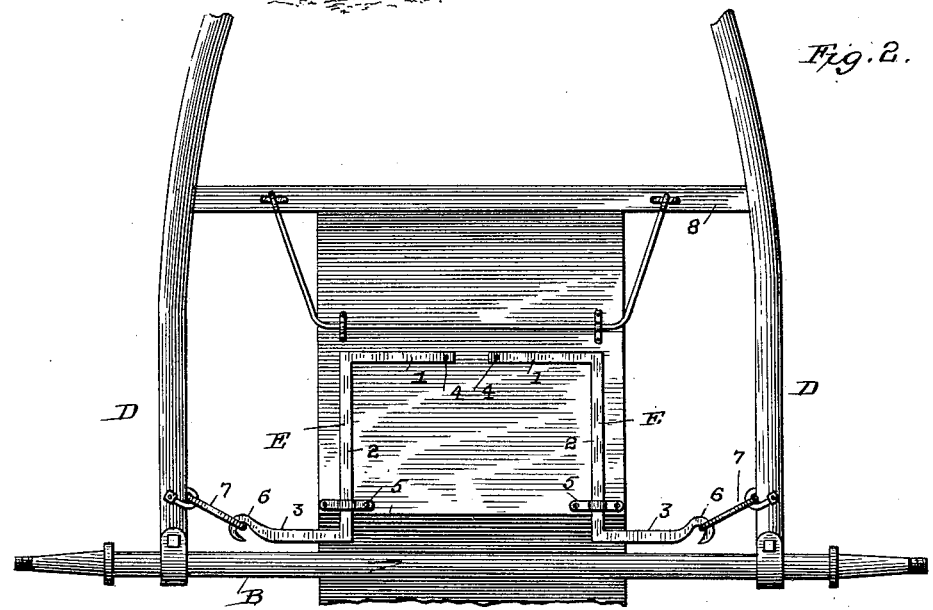
WITNESSES
Edwin L. Yewell.
Chas Helm
INVENTOR
John W. Brown
By John G. Manahan
his Attorney

UNITED STATES PATENT OFFICE.

JOHN W. BROWN, OF ROCK FALLS, ILLINOIS.

ROAD-CART.

SPECIFICATION forming part of Letters Patent No. 405,826, dated June 25, 1889.

Application filed March 29, 1888. Renewed April 19, 1889. Serial No. 307,871. (No model.)

*To all whom it may concern:*

Be it known that I, JOHN W. BROWN, a citizen of the United States, residing at Rock Falls, in the county of Whiteside and State of Illinois, have invented certain new and useful Improvements in Road-Cart Springs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to road-carts, and pertains more especially to the construction and seating of the spring or springs thereof, the intention being to simplify and cheapen the springs to the utmost degree and at the same time to attain sufficient strength and flexibility to render the vehicle strong enough for the purposes intended and comfortable to the occupant.

Another advantage in my invention is the convenience it affords for mounting and alighting from the vehicle. As the spring is entirely beneath the floor of the body of the vehicle at or about the plane of the lower edge of the axle, there is nothing between the wheels and the body of the vehicle on either side to prevent ready access into the body of the vehicle from the rear over the axle. One or more steps suitably suspended from the axle enables the occupant to easily reach a sufficient height that he may without inconvenience step over the axle from the rear into the body of the vehicle.

My invention is of course equally applicable to single or double seated carts, and can be made of such strength and to resist such pressure as may be desired.

In the drawings, Figure 1 is a side elevation in perspective of a two-wheeled vehicle embodying my invention. Fig. 2 is a detail of the bottom of that portion of the vehicle forward of the axle, showing the mode of attaching the forward end of the spring to said body.

As my invention pertains to the method of swinging the body of the vehicle or of attaching the same to the axle and shafts, I do not deem it necessary to show or describe very fully those parts of the vehicle outside of my invention, except so far as to render intelligible the mode of application and operation of my said invention.

A is the ordinary cart or buggy box, which can be constructed of any of the well-known and convenient forms and furnished or upholstered as may be desired.

B is an axle, which is suitably supported at each end in the usual way upon carrying-wheels C C, the latter rotating on said axle.

D D are the shafts, which are rigidly attached at their inner or rear ends, respectively, to the axle B, so as to hold the latter from rotation and oscillation.

To the bottom of the box A in front of the seat in said box, and beneath what might be termed the "boot" or "foot" rest, are attached springs E E. The springs E consist, respectively, of the inner or forward part 1, central part 2, and outward or rear part 3. The parts 1 and 2 are formed at right angles to each other, the part 1 extending inwardly parallel to the axle B, and part 2 extending rearwardly perpendicular to said axle. The parts 1 and 2 are placed flatly against the bottom aforesaid of the box A, and held by vertical bolts 4, at or near the inner end of the spring E, closely against said bottom. Parts 1 and 2 of the spring E are further held parallel and in close contact with the bottom of the box A by means of a box 5, suitably attached to the lower surface of the box A, and adapted to hold the spring E rigidly against all motion except a slight axial rotation. The part 3 of the spring E is projected outward and slightly downward and furnished at its lower and outward extremity with the hook 6, adapted to engage and be supported by link 7, which in turn has a pivotal connection at its upper end with the lower side of the shaft D.

The parts just described, consisting of the spring E and its attachments, being placed in front of a vertical line drawn through the seat of the vehicle, and the main weight of the occupant of the latter being therefore behind said springs, the latter operates as a fulcrum, the box A being the lever. Therefore the springs E support substantially the entire weight of the body A and its occupants.

The front end of the box A is pivotally attached in any suitable manner to the crossbar 8 or the shaft D, as may be preferred. The function of the latter attachment is to afford slight pivotal action to the front end of the box A and prevent the latter from tilting.

It will be observed that the part described of the spring E is but one-half, or but one of the two inner springs employed. The springs E are substantial counterparts of each other, except that the forward ends of each project inwardly. The adjacent inner ends of the springs E may be united, if preferred; but no difference in their function or operation is observed whether united or single, and I think a separate form preferable, inasmuch as less expense is involved in case of breakage.

In the vehicle which I have constructed in accordance with my invention and have had in operation for some time the size of the spring is a five-eighths rod, and the same carries without breaking or serious strain a weight of four hundred pounds. The spring can be made lighter or heavier in view of the requirements of each case. The elasticity of the spring is of course of the torsional order, the main motion of the spring being in the part 2, which lies parallel with the line of movement. As the body A settles by reason of the loading or concussion, the outer ends 3 of the springs E, which project slightly downward, are brought toward the plane of the residue of the springs, and will of course extend farther from the box A. The attachment necessary to permit this is the capability of the link 7 to swing outward sufficiently to permit the spreading aforesaid of the hook 6.

What I claim as my invention, and desire to secure by Letters Patent of the United States, is—

1. The combination of the axle B, shaft D, rigidly seated thereon, body A, torsional springs E, box 5, and flexible link 7, substantially as shown, and for the purpose described.

2. In a two-wheeled vehicle, the springs E, composed of three parts 1, 2, and 3, the part 2 being substantially perpendicular to the parts 1 and 3 and integral therewith, the parts 1 being rigidly attached to the bottom of the box A, the part 2 being journaled in the box 5, attached to the bottom of said box A, and the downward and outwardly extending part 3 furnished at its extremities with hook 6, adapted to be engaged and supported by link 7, suitably suspended from the shaft D or other suitable part of the frame, substantially as shown, and for the purpose described.

In testimony whereof I affix my signature in presence of two witnesses.

JOHN W. BROWN.

Witnesses:
JOHN G. MANAHAN,
JAMES H. WOODBURN.